United States Patent

[11] 3,610,879

| [72] | Inventors | Lawrence Katzman<br>101 Central Park West, New York, N.Y. 10023;<br>Edward Briggin, 720 East 84th St., Brooklyn, N.Y. 11236 |
|---|---|---|
| [21] | Appl. No. | 884,911 |
| [22] | Filed | Dec. 15, 1969 |
| [45] | Patented | Oct. 5, 1971 |

[54] INSULATED HEATING CHAMBER FOR VAPORIZERS
8 Claims, 4 Drawing Figs.

[52] U.S. Cl. ........................................ 219/271,
21/119, 128/192, 219/284, 219/314
[51] Int. Cl. .................................................. H05b 3/60
[50] Field of Search ........................................ 219/284–295,
271–276, 362, 314; 128/186, 192;
21/117, 118, 119

[56] References Cited
UNITED STATES PATENTS

| 1,430,548 | 10/1922 | Hogue | 219/273 |
|---|---|---|---|
| 1,749,969 | 3/1930 | Brodin | 219/275 UX |
| 2,023,324 | 12/1935 | Johnson et al. | 219/275 UX |
| 2,076,709 | 4/1937 | Deutsch | 219/275 |
| 2,211,407 | 8/1940 | Christensen | 219/272 |
| 2,763,765 | 9/1956 | Duberstein et al. | 219/289 X |
| 2,847,734 | 8/1958 | Tauben | 21/118 X |
| 3,319,046 | 5/1967 | Katzman et al. | 219/275 |
| 3,518,409 | 6/1970 | Corbett | 219/271 |
| FOREIGN PATENTS | | | |
| 452,151 | 5/1968 | Switzerland | 219/285 |

Primary Examiner—A. Bartis
Attorney—Kenneth S. Goldfarb

ABSTRACT: An electric steam vaporizer has a water container with a top opening covered by a removable cap having depending therefrom a heating chamber. The heating chamber includes a lower portion of lesser cross section containing an electrode assembly for vaporizing water entering the chamber through an inlet in the lower portion. The cap has secured thereto a double-walled air-filled insulating chamber surrounding the heating chamber and spaced from the lower portion thereof. The insulating chamber forms a thermal insulation barrier between the heating chamber and the water in the outer parts of the container. The insulating chamber engages a pair of ribs arising from the container bottom to limit water flow out of the space between the insulating and heating chambers.

PATENTED OCT 5 1971 3,610,879
FIG. 1
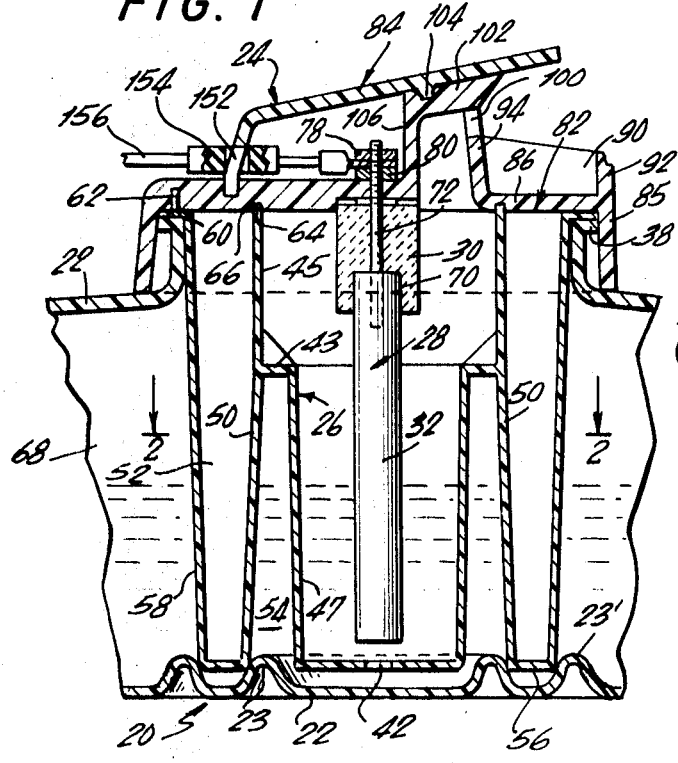
FIG. 4
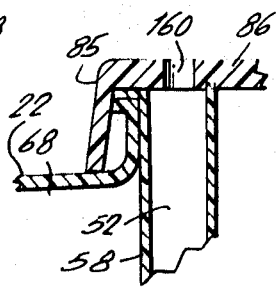
FIG. 2
FIG. 3
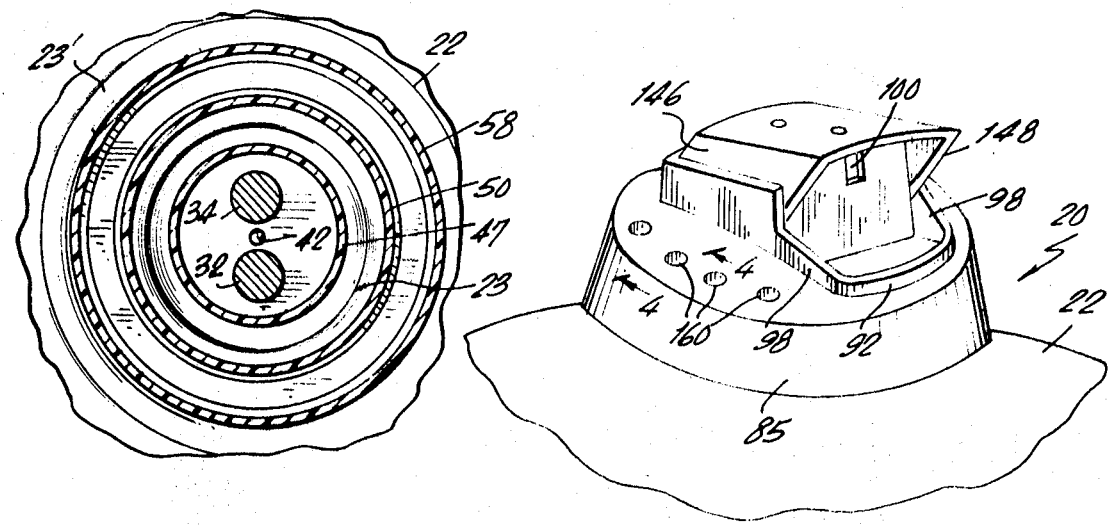
INVENTORS
LAWRENCE KATZMAN
EDWARD BRIGGIN
BY
Kenneth S. Goldfarb
ATTORNEY

INSULATED HEATING CHAMBER FOR VAPORIZERS

This invention relates to an electric steam vaporizer of the type disclosed in U.S. Pat. No 3,319,046, issued May 9, 1967, for "Electrode and Heating Chamber for Vaproizers."

In the past, electrical steam vaporizers have been developed in which hot water is heated by electrodes and then passes outside of an outlet opening in a cap in a manner so as to pick up any suitable medication and be directed toward the user. In order to achieve greater safety in the use and operation of such vaporizers, it is contemplated to provide an insulating chamber open to the atmosphere which will surround the heating chamber and prevent the water in the vaporizer container from becoming heated which may render the container uncomfortable to touch while also being wasteful of power.

In vaporizers having heating chambers into which electrodes extend, the heating chamber is provided with an inlet opening. However, when the hot water is heated to a great degree, some of the water will pass out of the heating chamber. It is contemplated to surround the heating chamber with an insulating chamber which not only reduces heat transference, but which will also limit flow of fluid from the space surrounding the heating chamber into the outer reaches of the container.

Another feature of the invention resides in the provision of an insulating chamber which cooperates with the cap from which it is suspended in such a manner as to be open to the atmosphere. Still further objects and features of this invention reside in the provision of a vaporizer that is capable of being manufactured by mass production methods out of readily available materials, which is so arranged that the heating chamber is secured to the cap and the electrodes are suspended from the cap in a convenient and simple manner, in which the heating chamber and insulating chamber are so arranged that they are capable of being manufactured as a single unitary integral element, and which is attractive in appearance and convenient to use.

These, together with the various ancillary objects and features of this invention, which will become apparent as the following description proceeds, are attained by this insulating heating chamber for vaporizers, a preferred embodiment of which is illustrated in the accompanying drawing, by way of example only, wherein:

FIG. 1 is a vertical sectional view through the cap, heating chamber, insulating chamber, and container of the vaporizer illustrating the relative arrangement of parts;

FIG. 2 is a horizontal sectional view taken along the plane line 2—2 in FIG. 1;

FIG. 3 is a partial perspective view of a vaporizer constructed in accordance with the concept of the present invention; and, FIG. 4 is an enlarged vertical sectional view taken along the plane of line 4—4 in FIG. 3.

With continuing reference to the accompanying drawing, wherein like reference numerals designate similar parts throughout the various views, reference numeral 20 generally designates the electric steam vaporizer comprising the present invention. The vaporizer includes a container 22 of a desired shape and which is preferably blow molded from linear polyethylene. A cap assembly 24 is provided and is formed from suitable insulative material, such as heat resistant Bakelite. A heating and insulating chamber assembly generally indicated at 26 is provided and preferably formed of suitable plastic material, such as nylon. There is also provided an electrode assembly, generally indicated at 28, including an insulated mounting member 30 and a pair of carbon electrodes 32 and 34. The container 22 is preferably provided with a neck having a peripheral flange 38 at the upper edge thereof.

The heating chamber 26 is provided with an opening or openings 42 therein. The chamber 26 has an enlarged upper portion 45 and a restricted lower portion 47 interconnected by a horizontal wall 43. Also integral with the upper portion 45 and forming a continuation thereof is the inner wall 50 of an insulating chamber 52 which tapes downwardly and away from the lower section 47 to form a space 54 therebetween. The insulating chamber 50 is defined by a bottom wall 56 and a tapered outer wall 58 which terminates in an upper flange 60 secured by fasteners 62 or the like to the cap assembly 24. The upper edge 64 of the upper portion 45 fits in a suitable groove 66 formed in the cap so that the fasteners 62 hold the heating and insulating chamber 26 to the cap in a convenient manner.

The container 22 is provided with a circular rib 23 which rises upwardly from the bottom of the container and is so arranged as to be closely spaced from the lower inner edge of the insulating chamber 52 so as to permit only minor flow of fluid from the exterior portions 68 of the container into the space 54. A second rib 23' may be provided which functions to reduce flow of fluid and to reduce leakage current by increasing the electrical path.

The electrode assembly 28 is so arranged that the insulating body 30 which is formed of porcelain is provided with suitable recesses 70 into which the electrodes 32 and 34 extend. Metallic studs 72 are imbedded in the electrodes 32 and 34 and extend through the insulated mounting member 30 and through the cap assembly 24. Nuts 78 and 80 are used to threadedly hold the studs 72 to the cap while clampingly holding the electrodes 32 and 34 in position.

The cap assembly 24 has two main portions, a main body 82 and a cover 84. The main body 82 has a peripheral side 85 which is circular in cross section and adapted to surround the neck of the container 22. Integral with the peripheral wall 85 is an upper wall 86. Integrally formed with the upper wall 86 is a steam chamber 90 bounded by a front wall 92 and a rear wall portion 94 as well as by spaced sidewalls 98. The rear wall 94 is provided with a steam dispensing aperture 100. The main body further has an angulated top wall 102 provided with a recess 104 therein and a back wall 106.

The cover 84 is provided with a pair of spaced downwardly extending flanges 146 and 148, which are adapted to extend into depressions in the main body provided therefor and is of the same construction as shown in the prior U.S. Pat. No. 3,319,046 having a slot 152 therein for holding the fittings 154 on an electric cord 156, which is connected to the studs 72.

The main body 86 is also provided with a series of apertures 160 therein which communicate with the insulating chamber 52.

Thus, it can be seen that the water within the heating chamber 26, which is heated, may spurt out of the opening 42. However, this water will not pass readily into the outer reaches 68 of the container 22 because flow is restricted by the close positioning of the insulating chamber 52 with respect to the rib 23 which may even abut the heating chamber in some positions. The insulating chamber 52 further surrounds the heating chamber and will prevent heat transfer to the outer reaches 68 of the container.

A latitude of modification, substitution and change is intended in the foregoing disclosure, and is some instances, some features of the invention may be employed without a corresponding use of other features.

We claim:

1. A vaporizer comprising a container having an opening, a cap positioned on said container overlying said opening, said cap having a steam outlet therein, a heating chamber secured to and depending from said cap, said heating chamber extending into said container and including an upper portion and a lower portion of lesser cross-sectional dimensions than said upper portion, said steam outlet being in communication with said heating chamber, an insulating chamber secured to said cap at least partially surrounding said heating chamber and spaced from said lower portion, said lower portion having a liquid intake opening therein, an electrode assembly suspended from said cap and extending into said lower portion, and means for connecting said electrode assembly to a source of electrical power, said insulating chamber extending coextensive with said lower portion, said insulating chamber including inner and outer walls, said inner wall extending downwardly and outwardly toward said outer wall.

2. A vaporizer according to claim 1, wherein said inner and outer walls are concentric with said heating chamber.

3. A vaporizer comprising a container having an opening, a cap positioned on said container overlying said opening, said cap having a steam outlet therein, said cap including an upper wall, a heating chamber secured to and depending from said cap and extending into said container, said steam outlet being in communication with said heating chamber, an insulating chamber secured to said cap surrounding said heating chamber and having at least a portion thereof spaced from said heating chamber, said heating chamber having a liquid intake opening therein, an electrode assembly suspended from said cap and extending into said heating chamber, means for connecting said electrode assembly to a source of electrical power, said container having a bottom provided with an upwardly extending rib, said rib extending into engagement with said insulating chamber for restricting fluid flow from said heating chamber to a location in said container outwardly of said insulating chamber.

4. A vaporizer according to claim 3, wherein a second rib surrounding said first rib further engages said insulating chamber for restricting fluid flow.

5. A vaporizer according to claim 3, said cap having at least one aperture therethrough in alignment with and communicating with said insulating chamber.

6. A vaporizer according to claim 3 wherein said rib is circular in shape.

7. A vaporizer according to claim 6, wherein said rib is closely spaced to said insulating chamber to permit only limited fluid flow.

8. A vaporizer according to claim 6, said insulating chamber being air filled, said cap having a plurality of apertures therethrough in alignment with and communicating with said insulating chamber.